United States Patent Office 3,215,630
Patented Nov. 2, 1965

3,215,630
CUTTING COMPOSITION
Maryann Compton, Loveland, Ohio, and Elmar Sucher, Burstadt, near Worms, Germany, assignors to The Cincinnati Milling Machine Company, Cincinnati, Ohio
No Drawing. Filed Nov. 12, 1964, Ser. No. 410,742
7 Claims. (Cl. 252—18)

This invention relates to aqueous cooling fluids for machining ferrous stock, and more particularly to aqueous metal salt solutions suitable for this purpose. This application is a continuation-in-part of our application Ser. No. 831,697, filed August 5, 1959, for "Cutting Composition," and now abandoned.

A great number of compositions have been proposed and used for cutting fluids, and many theories have been developed to explain and predict the properties of such fluids. A comprehensive review on the work done in the field of cutting fluids is found in the report compiled by Battelle Memorial Institute and published by ASTE Research Fund as "Final Report on an Evaluation of the Present Understanding of Metal Cutting." Said report shows, in effect, that the reasons for the different behaviour of cutting fluids under different conditions are not yet fully understood.

Our investigations have been concerned with the cutting, and particularly the low clearance cutting, of ferrous stock with ferrous tools in the presence of various cutting fluids. In these investigations, conventional cutting fluids proved unsatisfactory, and it was found that cutting fluids reported to be suitable for machining and grinding metals other than iron, had not the same effects in the cutting of ferrous stock.

We have discovered that in order to obtain optimum performance of aqueous salt solutions in the cutting of ferrous stock with ferrous tools, a definite size relationship has to be established between the ions of the salt used in the solution, which salt forms a film between stock and tool, and the unit cell dimensions of the alpha-iron crystals in the ferrous stock to be machined and in the tool. This discovery has made it possible to develop aqueous cutting fluids which are far superior to the aqueous fluids used heretofore.

Metal salts used in cutting fluids for ferrous stock should contain ions which, in the solid crystal state, have a size suitable to cover the [100] faces of the alpha-iron crystals on the contact surfaces. Excellent results are, therefore, obtained with solutions of metal salts of inorganic acids the ions of which are either small enough to be adsorbed on every available site of an iron cell surface such as the $F^-$ ion ($r^-=1.33$ A.), or which have effective radii substantially equal to the 2.86 A. unit cell distance in iron; such an ion is the sulfate ion. Accordingly, all metal fluorides and sulfates are, in the machining of ferrous stock, excellent cutting fluid ingredients, independently of the metal cation.

For all inorganic metal salts having anions intermediate in size between fluoride and sulfate ions, anion adsorption does not give complete coverage of the iron surface, and in this area a definite cation/anion ratio is required to obtain such coverage, which ratio is, to a certain extent, a function of the steric structure of the ions. Thus, we found that the cation-anion radius ratio of chlorides, bromides and iodides must be about 0.35 to 0.74, and that of nitrates and nitrites about 0.45 to 0.74.

It appears that only metal salts satisfying the above recited ion size conditions form complete sorption layers between the ferrous chips and tool necessary to prevent the welding of the metal chip to the cutting edge of the tool, which is responsible for the obnoxious erratic "build-up and break-away" of the chips on the tool in cutting operations. However, it should be understood that the theory advanced here is given only in an attempt to explain the unexpected results obtained with the recited salts and that the scope of the claims should in no way be limited by such theory.

The following table lists the performance of aqueous cutting solutions of different metal salts and their cation-anion radius ratio $r^+/r^-$. It will be seen that salts satisfying the above conditions, which salts have not been used before as cutting fluids in the machining of ferrous stock, show a much better performance than the salts conventionally used for this purpose, such as sodium nitrite and sodium nitrate.

The test procedure was as follows:

A wedge-shaped high-speed steel tool is forced against the end of a rotating steel tube of ¼ in. wall thickness. The feed force of the tools is sufficient to cut a V-groove in the tubing wall, and the chips flow out of the cutting area in two ribbons (one ribbon from each face of the wedge-shaped tool). The forces on the tools as a result of work-piece rotation and of tool feed are measured by a tool post dynamometer connected to a Sanborn recorder. Any welding of chip to tool build-up is reflected in the interruption of chip-flow (visual) and in increased resistance to work-piece rotation.

The cutting tests were performed with the tool-chip interface flooded throughout the operation by circulating test solution. Tool and workpiece were in constant dynamic contact during this time, and the test was not begun until full contact was achieved all along each cutting edge.

All solutions were 2% (wt.) in water, and the qualitative ratings from "excellent" to "stall" are composites of tool force recordings, quality of chips removed, and the resulting quality of the work-piece finish. Excellent performance is characterized by uniform forces throughout the length of the cut, and is visually reflected in uniformity of the surface of the work-piece (both as to size and smoothness) and in reduced tool wear. Complete failure occurs when the machine stalls. "Poor" performance is shown in the dynamometer records by recurrent sharp increases and sharp decreases of the forces, caused by the continuous "build-up" and "break-away" of the chips welded to the tool edge.

PERFORMANCE OF AQUEOUS SOLUTIONS OF INORGANIC METAL SALTS AS CUTTING FLUIDS FOR FERROUS STOCK

| Salt | $r^+/r^-$ | | Salt | $r^+/r^-$ | |
|---|---|---|---|---|---|
| $CuCl_2$ | 0.38 | Excellent. | $Ni(NO_3)_2$ | 0.30 | Stall. |
| $HgCl_2$ | 0.58 | | $Co(NO_3)_2$ | 0.32 | |
| $SnCl_2$ | 0.55 | | $Mg(NO_3)_2$ | 0.29 | |
| $CaCl_2$ | 0.55 | Very Good. | $Fe(NO_3)_3$ | 0.23 | |
| $SnCl_4$ | 0.39 | | $Al(NO_3)_3$ | 0.20 | |
| $NiCl_2$ | 0.38 | | $CrCl_3$ | 0.30 | Poor. |
| $KCl$ | 0.74 | | $AlCl_3$ | 0.25 | Stall. |
| $BaCl_2$ | 0.71 | | $CuBr_2$ | 0.35 | Excellent. |
| $SrCl_2$ | 0.61 | | $KBr$ | 0.68 | Good. |
| $LaCl_3$ | 0.57 | | $NaBr$ | 0.50 | |
| $NaCl$ | 0.54 | | $KNO_2$ | 0.58 | Good. |
| $CdCl_2$ | 0.51 | | $NaNO_2$ | 0.43 | Fair. |
| $MnCl_2$ | 0.44 | Good. | $CuSO_4$ | 0.26 | Excellent. |
| $FeCl_2$ | 0.41 | | $Li_2SO_4$ | 0.25 | |
| $CoCl_2$ | 0.40 | | $SnSO_4$ | 0.37 | Very Good. |
| $ZnCl_2$ | 0.39 | | $Fe_2(SO_4)_3$ | 0.20 | |
| $LiCl$ | 0.38 | | $MgSO_4$ | 0.24 | |
| $MgCl_2$ | 0.36 | | $NiSO_4$ | 0.25 | |
| $FeCl_3$ | 0.29 | | $ZnSO_4$ | 0.26 | |
| $AgNO_3$ | 0.55 | Excellent. | $CoSO_4$ | 0.27 | Good. |
| $Hg(NO_3)_2$ | 0.46 | | $FeSO_4$ | 0.28 | |
| $KNO_3$ | 0.58 | | $MnSO_4$ | 0.30 | |
| $Ba(NO_3)_2$ | 0.57 | Good. | $Na_2SO_4$ | 0.36 | |
| $Sr(NO_3)_2$ | 0.48 | | $CdSO_4$ | 0.37 | |
| $Pb(NO_3)_2$ | 0.51 | | $K_2SO_4$ | 0.50 | |
| $NaNO_3$ | 0.43 | | $KI$ | 0.61 | Good. |
| $Mn(NO_3)_2$ | 0.35 | | $NaI$ | 0.45 | |
| $LiNO_3$ | 0.30 | Poor. | $KF$ | 1.00 | Very Good. |
| $Cr(NO_3)_3$ | 0.24 | | $NaF$ | 0.74 | Good. |
| $Be(NO_3)_2$ | 0.13 | | $Al_2(SO_4)_3$ | 0.16 | Fair. |
| | | | $Cr_2(SO_4)_3$ | 0.20 | |

In the table, FeCl₃ having a $r^+/r^-$ ratio of 0.29 is listed as "good" and seems to contradict the rule that chlorides should have a $r^+/r^-$ ratio within the range of 0.35 to 0.74 to constitute good cutting compositions. This contradistinction is, however, only apparent as FeCl₃ is, under the operating conditions, reduced on the ferrous surfaces to FeCl₂, which has the required $r^+/r^-$ ratio of 0.41.

One particularly interesting and unexpected result of our discovery is that, in contradistinction to certain sodium salts used heretofore in cooling fluids essentially as rust proofing additives, the corresponding potassium salts are themselves highly effective in reducing the cutting forces in the cutting of ferrous stock.

Among the useful salts, those of certain heavy or rare metals show excellent performance. Nevertheless, said salts will be too expensive for most commercial applications, and they have the additional drawback that they may enter into undesirable chemical or electrochemical surface reactions with the iron surface of the workpiece.

Another point to consider in selecting a salt, or a mixture of salts, from the list given above is the solubility. Again for economic reasons, it is of advantage to ship and store cutting compoistions in concentrated solution. It is, therefore, of advantage to use salts which have a high solubility in water, e.g. at least about 10 g. in 100 cc. of water at 20° C.; such salts have the additional advantage that they have less tendency to form salt deposits on the machines. However, also less soluble salts of the character described may be used, particularly when their solubility is increased by suitable additives.

As set forth hereinbefore, the good performance of the inorganic metal salts having the described ion size characteristics, is closely related to their capability of reducing the "build-up" of the ferrous chips on the ferrous tool, thereby preserving the sharp cutting edge of the tool during the whole cutting operation. This desired and favorable effect has, however, the somewhat paradoxical result that the tool wear is increased. When using such salts, it is, therefore, necessary to employ the same in combination with agents protecting the tool surface and reducing its wear.

Though they are incompatible with a great number of the metal salts recited hereinabove and compatible essentially only with alkali metal salts, we employ anionic surfactants because we found them to be more suitable for providing the desired protection of the tools than cationic or non-ionic surfactants. Any such anionic surfactant may be used, provided it does not react with the metal salt or other components of the cutting fluid to form precipitates or insoluble reaction products.

When using potassium salts, which we prefer because of their high solubility and good compatibility, we may use not only alkali metal or amine, particularly alkanolamine, soaps of higher fatty acids and rosin acids but practically any anionic surface agent which has sufficient water solubility and is compatible with the ingredients of the cutting fluid. Such anionic surface active agents may be carboxylic acid derivatives other than the recited soaps, organic sulfates, sulphonates and phosphates and derivatives thereof, such as phosphate compounds prepared according to General Aniline & Film Corporation Patents 3,004,056, 3,004,057 and 3,033,889. The term "anionic surfactants" is understood to include also amphoteric surfactants which are free acids and become anionic in an alkaline medium or in the form of their alkali metal or amine salts. Such anionic surfactants derived from amphoterics are alkali metal or amine salts of the so-called N-interrupted carboxylic and dicarboxylic acids prepared, for intsance by condensation of acrylic monomers and fatty primary amines, or of saturated carboxylic acids with unsaturated amines. Such anionic N-interrupted carboxylic acid derivatives contain an anion of the general formula $(RNHR'COO)^-$ where R′ is an alkylene group, for instance $C_2H_4$, and R is alkyl, preferably a long chain alkyl of at least 12 carbon atoms. Such anionics derived from amphoterics or from the phosphate compounds described above have the advantage of high stability even in cutting solutions prepared with very hard water.

We use the anionic surfactants, or a mixture of different such surfactants, generally in amounts of about 1 to 5 parts by weight for 1 part of the metal salt; however, depending on the specific metal salts and anionic surfactant used, the amount may be as low as 0.5 part and as high as 10 parts by weight for 1 part of the metal salt. In concentrates used for storage and shipment, the amount of the anionic surfactants must generally not exceed about 25 percent by weight of the solution in order to avoid precipitation.

In addition to the inorganic metal salt and the surfactant, which are the essential components of the cutting fluid, the fluid may contain conventional rust inhibitors, antifoaming agents, bactericides, and other additives. Suitable rust inhibitors are, for instance, alkanolamines and alkali metal borates or phosphates. As antifoaming agents, silicones are used with advantage, and as bactericides we use preferably substituted phenols, for instance the compositions sold by Dow Chemical Co. under the trade name "Dowicide," tris (hydroxymethyl) nitromethane, and others. In preparing the fluid, the ingredients have to be selected, of course, so as not to affect each other or to form insoluble precipitates.

The following examples are given by way of illustration and not in limitation.

*Example 1*

10 parts of KF.2H₂O are dissolved in 60 parts of water of a temperature of 65° C., and first 20 parts of triethanolamine and then 10 parts of oleic acid are added to the hot solution.

In said solution, there are then incorporated 0.2 parts of a silicone marketed under the trade name Silicone Antifoam B by Dow-Corning Corp., as an antifoaming agent, and as a bactericide 1.5 parts of the composition marketed under the trade name Dowicide A by Dow Chemical Co.

For use as a cutting fluid, 1 part of the obtained solution is diluted with about 10 to 40 parts of water, and additional rust inhibitor may be added when required for the stock to be machined.

*Example 2*

A mixture of 20 parts triethanolamine and 20 parts of a 50% aqueous solution of N-coco β-aminodipropionic acid is stirred at 60° C. until homogeneous. The resultant mixture is then added with stirring to a solution of 10 parts potassium nitrite in 50 parts water at 60° C.

To the resultant solution is added 0.2 parts of a silicone defoamer, 1.5 parts bactericide such as Dowicide A, and 2–6 parts coupling agent.

This solution is diluted for use as the solution of Example 1.

*Example 3*

In 58.5 parts water at 60° C. we dissolved in succession with stirring 10 parts potassium nitrite, 15 parts triethanolamine, 15 parts sulfated tall oil fatty acid, and 1.5 parts bactericide (Dowicide A).

The solution is diluted for use as the solution of Example 1.

*Example 4*

A mixture of 10 parts of the previously mentioned phosphate compound, Antara LE 500 (General Aniline and Film Corporation) and 17.5 parts triethanolamine are stirred at 60° C. until homogenous and added with stirring to a solution of 10 parts potassium nitrite in 62.5 parts water at 60° C.

To the resultant solution is added 0.2 parts of a silicone defoamer, 1.5 parts bactericide, such as Dowicide A, and 2–6 parts coupling agent.

This solution is diluted for use as the solution of Example 1.

While the invention has been illustrated by certain specific embodiments thereof, it is understood that substitutions and modifications may be made within the effective scope of the appending claims. In liquid concentrates, the upper concentration is limited only by the solubility of the respective salt and surfactant. For actual operation, the salt concentration in the solution will be generally about 1 to 5 percent by weight but under particularly favorable conditions, concentrations as low as 0.1 percent may be effective. In addition, under circumstances where excessive tool wear can be tolerated for limited periods of time, it should be understood that certain of the recited salts such as potassium fluoride, and some of the listed salts of the metals other than alkali metals, may be used alone or in combination with other compatible surfactants.

We claim:

1. A cutting fluid concentrate consisting essentially of an aqueous solution containing completely dissolved therein as the essential film-forming ingredient at least about 5 percent by weight of an alkali metal salt selected from the group consisting of sulfates; fluorides; chlorides, bromides, and iodides having a cation-anion radius ratio of about 0.35 to 0.74; nitrites, and nitrates having a cation-anion radius of about 0.45 to 0.74; and mixtures of said salts, and further containing an anionic surfactant compatible with said salt in aqueous solution, the amount by weight of said anionic surfactant being 0.5 times to five times the amount of said salt and not exceeding about 25 percent by weight of the total solution.

2. The cutting fluid concentrate of claim 1 wherein said metal salt is a potassium salt.

3. The cutting fluid concentrate of claim 1 wherein said anionic surfactant is a soap of a member of the group consisting of alkali metals and alkanolamines with a member of the group consisting of higher aliphatic acids and rosin acids.

4. An aqueous composition consisting of the cutting concentrate of claim 1 in combination with at least one member of the group consisting of rust inhibitors, antifoaming agents, and bactericides.

5. In the machining of ferrous workpieces with ferrous tools and application of a cooling and lubricating fluid to the worked ferrous surface, the improvement which consists in employing a cooling and lubricating fluid consisting essentially of an aqueous solution of about 0.1 to 5 percent by weight of a water soluble alkali metal salt selected from the group consisting of sulfates; fluorides; chlorides, bromides and iodides having a cation-anion ratio of about 0.35 to 0.74; nitrites and nitrates having a cation-anion radius ratio of about 0.45 to 0.74; and mixtures of said salts; and an anionic surfactant in an amount by weight of about 0.5 to 10 times the amount of said salt.

6. The method claimed in claim 5 wherein said cooling and lubricating fluid is employed with at least one member of the group consisting of rust inhibitors, antifoaming agents, and bactericides.

7. The method claimed in claim 5 wherein said anionic surfactant is a soap of a member of the group consisting of alkali metals and alkanolamines with a member of the group consisting of higher aliphatic acids and rosin acids.

References Cited by the Examiner

UNITED STATES PATENTS

| | | | |
|---|---|---|---|
| 284,345 | 9/83 | Watson et al. | 252—49.3 X |
| 1,548,515 | 8/25 | Dudzeele | 252—49.3 X |
| 2,008,939 | 7/35 | Trefts | 252—49.3 X |
| 2,252,385 | 8/41 | Orozco | 252—9.8 |
| 2,477,383 | 7/49 | Lewis | 252—161 |
| 2,692,859 | 10/54 | Talley et al. | 252—33.4 X |
| 2,742,436 | 4/56 | Jenkins. | |
| 2,825,693 | 3/58 | Beaubien et al. | 252—49.3 X |
| 2,917,160 | 12/59 | Turinsky | 252—51.5 X |

FOREIGN PATENTS

| | | |
|---|---|---|
| 490,285 | 8/38 | Great Britain. |
| 663,062 | 12/51 | Great Britain. |

DANIEL E. WYMAN, *Primary Examiner.*